United States Patent [19]

Ohtsu

[11] Patent Number: 4,897,280

[45] Date of Patent: Jan. 30, 1990

[54] PROCESSED SOYBEAN CURD FOOD HAVING A TEXTURE SIMILAR TO MEAT

[75] Inventor: Hideo Ohtsu, Kawasaki, Japan

[73] Assignee: The Nisshin Oil Mills, Ltd., Tokyo, Japan

[21] Appl. No.: 90,459

[22] Filed: Aug. 28, 1987

[30] Foreign Application Priority Data

Sep. 3, 1986 [JP] Japan ................ 61-208697

[51] Int. Cl.⁴ .............................................. A23J 1/14
[52] U.S. Cl. .................................... 426/656; 426/104
[58] Field of Search ............................... 426/656, 104

[56] References Cited

U.S. PATENT DOCUMENTS

| | | | |
|---|---|---|---|
| 4,391,835 | 7/1983 | Katayama et al. | 426/656 |
| 4,490,397 | 12/1984 | Maurice | 426/656 |
| 4,525,373 | 6/1985 | Hosaka | 426/634 |
| 4,642,241 | 2/1987 | Noguchi | 426/656 |
| 4,740,379 | 4/1988 | Noguchi et al. | 426/634 |

FOREIGN PATENT DOCUMENTS

| | | | |
|---|---|---|---|
| 1130634 | 4/1980 | Canada | 426/656 |
| 0187745 | 10/1984 | Japan | 426/656 |
| 59-192059 | 10/1984 | Japan . | |
| 60-130363 | 7/1985 | Japan . | |
| 241869 | 11/1985 | Japan | 426/656 |
| 018089103 | 11/1985 | Japan | 426/656 |
| 61-78356 | 4/1986 | Japan . | |
| 61-115466 | 6/1986 | Japan . | |
| 2055046 | 3/1987 | Japan | 426/656 |
| 2055058 | 3/1987 | Japan | 426/656 |

Primary Examiner—Donald E. Czaja
Assistant Examiner—Helen Pratt
Attorney, Agent, or Firm—Frishauf, Holtz, Goodman & Woodward

[57] ABSTRACT

A processed soybean curd (tofu) food having a texture similar to meat. The food contains soybean curd and a fibrous soybean protein material mixed therein. The protein material is prepared by using a single or twin screw extruder.

7 Claims, No Drawings

PROCESSED SOYBEAN CURD FOOD HAVING A TEXTURE SIMILAR TO MEAT

BACKGROUND OF THE INVENTION

1. Field of the Invention

The present invention relates to processed soybean curd food and, more particularly, to processed soybean curd food having a texture similar to livestock meat.

2. Description of the Prior Art

Soybean curd (tofu) is a popular Japanese traditional food and is available in the form of soft tofu and firm tofu, as well as in the secondary product form of deep-fried tofu pouches curd (Age), tofu-treasure-tofu (Ganmo), and the like. In recent years, processed soybean curd products, such as the tofu burger, having forms and flavor similar to meat products, have become available.

These processed tofu products contain no cholesterol and are served as low-calorie food, as compared with meat products, and have received a great deal of attention as a food for good health.

However, the conventional processed tofu products are prepared by simply mashing tofu or using partially dewatered soybean curds obtained by compression or centrifugal dewatering. The taste and texture of these tofu products are quite unlike meat products. For example, Japanese Patent Publication No. 56-33067 discloses a tofu product having a water content of 50 to 60%, and obtained by applying a compression force to a coagulated body (tofu) of soybean milk. Although the texture of this tofu product differs from normal tofu, it is completely different from that of meat products.

SUMMARY OF THE INVENTION

It is therefore an object of the present invention to provide a processed soybean curd (tofu) product which has a texture similar to meat products.

The soybean curd product according to the present invention comprises soybean curd and a fibrous soybean protein material, processed by either a single or twin screw extruder, and disposed in the soybean curd.

DESCRIPTION OF THE PREFERRED EMBODIMENTS

The present inventor has carried out extensive studies to develop soybean curd products having a texture similar to meat products The present inventor found that the prescribed object could be achieved by use of a combination of soybean curd and a fibrous soybean protein material prepared by a single or twin screw extruder The soybean curd used in the present invention is obtained by coagulating soybean milk prepared from whole soybeans or defatted soybeans, according to a conventional method In this case, a coagulant such as gluconodeltalactone (GDL), calcium sulfate, or magnesium sulfate is used. The soybean milk may be soy puree containing insoluble residues. If a processed soybean curd product is desired, which is rich in fibrous material or dietary fiber, a soybean curd prepared by coagulating soy puree with the above coagulant should preferably be used.

The soybean curd prepared by a conventional method has a water content of about 90%. In order to obtain a finished product having a suitably tough texture, the soybean curd should preferably be dewatered by compression or centrifugal separation, so as to have a water content of 75 to 85%. The water content can be adjusted to 75 to 85% by the addition of textured soy protein, soybean milk powder, isolated soy protein and/or concentrated soy protein, instead of dewatering.

According to the present invention, the fibrous soybean protein material used together with the soybean curd is prepared such that soybean protein, starch, and an edible oil (if needed) are used as materials, these materials are supplied to the single or twin screw extruder while water is also supplied thereto, and the materials are compressed and heated by the extruder.

Examples of the soybean protein, as one of the materials forming the fibrous soybean protein material, are isolated soybean protein, concentrated soybean protein (washed with alcohol or an acid), and defatted soybean flour. Examples of the starch used are wheat flour, wheat starch, potato starch, corn starch, and sweet potato starch. The edible oil used, as needed, may be a vegetable oil or animal fat and oil.

70 to 90 parts by weight of soybean protein, 10 to 30 parts by weight of starch, and 0 to 5 parts by weight of an edible oil are mixed together, and 10 to 50 parts by weight of water is added to the mixture, to prepare the fibrous soybean protein material. If the mixing ratio falls outside the above range, the mixture cannot easily be extruded as a fibrous structure by an extruder, but instead, emerges as a net-like structure.

The extruder used in the present invention may be a single screw extruder or a twin screw extruder having higher feed and mixing capacities. When the fibrous soybean protein material is prepared, temperature of the extruder barrel is preferably 100 to 200° C., its pressure is preferably 20 to 80 kg/cm$^2$, and the rotation speed of the screw is preferably 80 to 180 rpm.

The puffed material extruded from the extruder is cut into pieces each having a length of 10 to 30 mm (width of 1 to 15 mm). Cutting the puffed material into pieces enables a processed soybean curd product to be obtained having a texture similar to meat products. Water is added to the thus obtained puffed material in an amount eight times that of the puffed material. Then, the material is heated, as required, and then dewatered. Alternatively, water is added in an amount three or four times that of the puffed material so as to make it swell, whereby a fibrous soybean protein material is obtained. This protein material contains 70 to 80% of water.

The processed soybean product according to the present invention is prepared such that the soybean curd is stirred and mixed with the fibrous soybean protein material, or such that the swollen fibrous soybean protein material is added to the soybean milk, and then a coagulant is added to the mixture.

The weight ratio (solid content weight ratio) of the soybean curd to the fibrous soybean protein material falls within the range of 5:1 to 1:1. If the ratio of the soybean curd is higher than the above range, the resultant product is too soft. If, on the other hand, the ratio of the fibrous protein material is higher than the above range, the resultant product is undesirably dry and crumbly.

Salt, sodium glutamate, meat extract, vegetable extract, and an edible oil may be added to a mixture of soybean curd and fibrous soybean protein material. A thermally coagulating protein such as egg albumin (egg white), or isolated soybean protein is added to the above mixture, if required. The mixture is mixed thoroughly and is molded or formed and coagulated by heating or frying, or, alternatively, the mixture is placed in a container such as a tray or casing, and is coagulated by boiling or is thermally sterilized in a retort, whereby a finished product is obtained. The water content of the finished product is preferably 60 to 80%. The above range of water content allows a processed soybean curd product to be obtained having a texture similar to meat products. In this case, soybean milk powder may be added at the time of mixing, so as to adjust the solid content.

The resultant processed soybean curd product can be sliced and baked (grilled) on a hot plate. The cooked soybean curd can be served as a tofu steak having a texture similar to meat products. Furthermore, the soybean curd product can be battered and fried to produce a food similar to fried chicken. Various recipes can be utilized for cooking the processed soybean curd product.

EXAMPLE 1

Calcium sulfate as a coagulant was added to soybean milk obtained from whole soybeans, according to a conventional method for preparing soybean curd. The curd was dewatered by a centrifugal separator, at a speed of 3,000 rpm for 20 minutes, whereby a soybean curd having a water content of 78% was obtained.

75 parts by weight of isolated soybean protein and 25 parts by weight of potato starch were mixed together thoroughly, and the resultant mixture was supplied from a feed port, into a twin screw extruder. At the same time, soybean oil and water were added to this substance, from an injection port, such that their contents were respectively 2% and 25%. The twin screw extruder was operated at a screw speed of 100 rpm, a die temperature of 150° C., and a pressure of 25 kg/cm$^2$. The substance was extruded from a 7-mm diameter die, and was cut into 20-mm long portions. Water was added to these extruded portions, in an amount ten times that of the portions. The mixture was heated to 85° C. and was stirred thoroughly for 30 minutes. The resultant mixture was dewatered by a centrifugal separator, whereby a fibrous soybean protein having a water content of 75% was obtained.

750 parts by weight of soybean curd, 250 parts by weight of fibrous soybean protein, 10 parts by weight of table salt, 3 parts by weight of sodium glutamate, 25 parts by weight of powdered egg white, 20 parts by weight of onion powder, 50 parts by weight of vegetable oil, and 20 parts by weight of meat extract were thoroughly mixed together by a mixer. The resultant mixture was placed in a rectangular tray, and was sterilized at 120° C. for 30 minutes.

The resultant processed soybean product was tasty and had a meaty flavor and a texture similar to meat products.

EXAMPLE 2

Gluconolactone was added to the soy puree derived from whole soybeans, according to a conventional method for preparing soybean curd containing soybean-insoluble residues. This soybean curd was compressed and dewatered, to adjust the water content to 85%.

15 parts by weight of corn starch were added to and mixed with 85 parts by weight of a concentrated soybean protein flour. The resultant mixture was fed from a feed port, into a twin screw extruder. At the same time, tap water was added to the substance, from a water supply port through a flow-control device, such that the water content of the resultant substance was set at 40%. The twin screw extruder was operated at a screw speed of 120 rpm, a barrel temperature of 135° C., and a pressure of 30 kg/cm$^2$. The resulting puffed substance was extruded from four 4-mm diameter dies, and was cut into 15-mm long portions. Warm water was added to these portions, in an amount 3.5 times that thereof, to obtain a fibrous soybean protein material having a water content of 80%.

70 parts by weight of the soybean curd, 20 parts by weight of the fibrous soybean protein, 10 parts by weight of soybean milk powder, 1 part by weight of salt, and 3 parts by weight of dried egg white were mixed by a kneader, and the resultant mixture was poured into a casing and molded by a retainer. The molded substance was boiled at 90° C. for 30 minutes. Subsequently, the material was cooled and sliced. The sliced portion were battered with starch containing seasonings, and were fried in vegetable oil, whereby a processed soybean food having a texture and flavor similar to fried chicken was obtained.

EXAMPLE 3

15 parts by weight of the extruded soybean protein substance prepared in Example 1 were added to 400 parts by weight of soybean milk having a solid content of 12% and derived from defatted soybeans, according to a conventional method. The mixture was heated, and calcium sulfate as a coagulant was added thereto, to obtain a mixed coagulate of the soybean curd and the fibrous soybean protein. The coagulate was then dehydrated by a centrifugal separator, to obtain a material having a water content of 78%.

20 parts by weight of beef powder, 140 parts by weight of onion (cut fine), 60 parts by weight of bread crumbs, 100 parts by weight of egg (both yolk and white), and 1 part by weight of seasonings were added to 800 parts by weight of the above coagulate. These materials were mixed together by a food processor. The resultant mixture was shaped into thin oval pieces. These pieces were grilled on a pan, to produce a processed soybean food having a texture and flavoring similar to hamburger pattie.

EXAMPLE 4

A hard tofu obtained by the conventional method was compressed and dewatered, to obtain a soybean curd having a water content of 82%. 40 parts by weight of the fibrous soybean protein (water content of 80%) prepared in Example 2, and 5 parts by weight of dried egg white were added to 60 parts by weight of the soybean curd, and were mixed together by a Stephen cutter.

The mixture was poured into a vat measuring 50×30 cm and coated with a mold releasing agent (oil), and was steamed for 45 minutes. The steamed material was cut into small portions which were then spit-roasted. These small pieces may be used for Japanese hotchpotch or battered and fried. Otherwise, the pieces may be broiled after they are dipped in a barbecue sauce. In any case, the cooked food had a texture similar to meat products.

EXAMPLE 5

10 parts by weight of the fibrous soybean protein (water content of 75%) prepared in Example 1 were added to 100 parts by weight of soybean milk (13.2% solid content), and the mixture was heated and a mixture of calcium sulfate and magnesium chloride as a coagulant mixture were added thereto. The resultant mixture was poured into a box for hard soybean curd, and was compressed and dried.

The resultant processed soybean food was cut into cubic pieces. They were tasty as used in a salad or gratin.

EXAMPLE 6

The mixture of the soybean curd, the fibrous soybean protein material, and seasonings was coated on a rectangular laver sheet, and fried in vegetable oil. The fried material was pitted by bamboo cooking pits and was dipped in soy sauce containing sugar, and then grilled. The cooked food had a texture and flavoring similar to spitchcock.

EXAMPLE 7

Following the same procedures as in Example 1, soybean curd was prepared. 75 parts of isolated soybean protein were mixed thoroughly with 25 parts of corn starch, and the resultant mixture was supplied to a supply port of a single screw extruder. At the same time, water was supplied from a water supply port, such that the water content in the mixture was 25%. The resultant substance was extruded at a screw speed of 150 rpm, a die temperature of 140° C., and a pressure of 20 kg/m$^2$, and was then cut into portions each having a diameter of 5 mm and a length of 20 mm. Water was added in an amount eight times that of the substance. The mixture was heated to and stirred at 85° C. for 30 minutes. The stirred mixture was dewatered by a centrifugal separator, to produce a fibrous soybean protein having a water content of 75%.

72 parts of the soybean curd, 28 parts of the fibrous soybean protein, 10 parts of onion dice, 0.1 part of white pepper, 2 parts of table salt, and 5 parts of egg white powder were mixed together thoroughly and shaped in an oval shape, to make patties. These patties were respectively packed together with gravy sauce in retort pouches, and were sterilized at 115° C. for 40 minutes.

As is apparent from the above description, processed soybean products having a texture and flavor similar to meat products can be obtained, and are quite different from the normal soybean curds obtained using the conventional method. (The food product of the invention has a texture resembling muscle fibers of meat). The new processed soybean curd products according to the present invention can be served as a low-calorie food for good health, and can be cooked using various recipes.

What is claimed is:

1. A processed soybean curd food having a texture similar to meat, comprising:
    soybean curd; and
    a fibrous soybean protein material prepared by using a single or twin screw extruder, and mixed together with the soybean curd to form the food with the texture similar to meat,
    said soybean curd being obtained by coagulating soybean milk prepared from whole or defatted soybeans,
    said protein material being obtained by heating and compressing a raw material containing 70 to 90 parts by weight of soybean protein, 10 to 30 parts by weight of starch, 0 to 5 parts by weight of an edible fat or oil, and 10 to 50 parts by weight of water and thereafter extruding the resulting substance, cutting the extruded substance into pieces each having a length of 10 to 30 mm, and swelling the cut pieces by adding water thereto.

2. The food according to claim 1, wherein the soybean curd and the protein material are mixed at a solid content weight ratio of 5:1 to 1:1.

3. The food according to claim 2, wherein the soybean curd has a water content of 75 to 85%.

4. The food according to claim 2, wherein the food has a water content of 60 to 80%.

5. The food according to claim 2, wherein the soybean curd and the protein material are stirred and mixed together.

6. The food according to claim 2, which is obtained such that the protein material is added to soybean milk for providing the soybean curd upon coagulation of the soybean milk, and the mixture of the protein material and the soybean milk is coagulated.

7. The food according to claim 1 wherein the fibrous soybean protein material is prepared by extruding in an extruder having one or two screws; an extruder barrel with a temperature of 100° to 200° C. and a pressure of 20 to 80 kg/cm$^2$; the rotation speed of the screw being 80 to 180 rpm.

* * * * *